(12) United States Patent
     Lin (10) Patent No.: US 11,027,793 B2
(45) Date of Patent: Jun. 8, 2021

(54) MULTI-SPEED DRIVE HUB FOR BICYCLE

(71) Applicant: Liang Wei Lin, Changhu (TW)

(72) Inventor: Liang Wei Lin, Changhu (TW)

(73) Assignee: Chang Hui Lin, Changhu (TW)

(*) Notice: Subject to any disclaimer, the term of this patent is extended or adjusted under 35 U.S.C. 154(b) by 194 days.

(21) Appl. No.: 16/283,772

(22) Filed: Feb. 24, 2019

(65) Prior Publication Data
    US 2020/0269955 A1    Aug. 27, 2020

(51) Int. Cl.
    *B62M 9/00*    (2006.01)
    *B62M 9/14*    (2006.01)
    *B62M 25/00*   (2006.01)

(52) U.S. Cl.
    CPC .............. *B62M 9/14* (2013.01); *B62M 25/00* (2013.01)

(58) Field of Classification Search
    CPC ........................................................ B62M 9/14
    See application file for complete search history.

(56) References Cited

U.S. PATENT DOCUMENTS

| 4,571,219 | A  | * | 2/1986  | Breden | B62M 25/00 |
| | | | | | 474/70 |
| 4,713,042 | A  | * | 12/1987 | Imhoff | B62M 9/14 |
| | | | | | 474/69 |
| 7,258,637 | B2 | * | 8/2007  | Thomasberg | B62M 9/14 |
| | | | | | 474/160 |

* cited by examiner

*Primary Examiner* — Blake A Tankersley (57) ABSTRACT

A multi-speed drive hub for a bicycle contains: a hub shaft, a speed-changing transmission, a speed shifter, and a sprocket set. The hub shaft is connected on a center of a wheel rim of the bicycle and includes a speed-changing transmission. The speed-changing transmission includes at least one drive element and an actuator for driving multiple force segments of the speed-changing transmission to rotate reciprocately. The speed shifter includes a fitting sleeve which has a third fixing orifice corresponding to the at least one drive element. The sprocket set includes multiple speed cassettes of different diameters and includes multiple spacing spaces, each of which is defined any two adjacent speed cassettes. The fitting sleeve has multiple ribs and multiple flexible sheets. Each drive elements includes multiple retainers, multiple columns, and multiple force segments.

7 Claims, 13 Drawing Sheets fig. 1 fig. 2 fig. 3 fig. 4 fig.5 fig. 6 fig. 7 fig. 8 fig.9 fig.10 fig.11 fig·12 fig. 13 fig·14

MULTI-SPEED DRIVE HUB FOR BICYCLE

FIELD OF THE INVENTION

The present invention relates to a multi-speed drive hub for a bicycle in which the at least one drive element drives the sprocket set to move so that the actuator moves to the multiple speed changing positions in a release direction relative to the speed-changing transmission, and the sprocket set smoothly changes to one of the multiple speed changing positions based on using requirements.

BACKGROUND OF THE INVENTION

A conventional ear ratio changing system commonly used on bicycles that is implemented with planetary or epicyclic gears. The gears and lubricants are sealed within the shell of the hub gear, in contrast with derailleur gears where the gears and mechanism are exposed to the elements. Changing the gear ratio was traditionally accomplished by a shift lever connected to the hub with a Bowden cable, and twist-grip style shifters have become common.

Hub gear systems generally have a long and largely maintenance-free life though some are not suitable for high-stress use in competitions or hilly, off-road conditions. Many commuter or urban cycles such as European city bikes are now commonly fitted with 7-speed gear-hubs and 8-speed systems are becoming increasingly available. Older or less costly utility bicycles often use 3-speed gear-hubs, such as in bicycle sharing systems. Many folding bicycles use 3-speed gear-hubs. Modern developments with up to 14 gear ratios are available. So, it is important to develop a multi-speed drive hub for a bicycle which is capable of changing a riding speeds of the bicycle smoothly based on using requirements.

The present invention has arisen to mitigate and/or obviate the afore-described disadvantages.

SUMMARY OF THE INVENTION

The primary objective of the present invention is to provide a multi-speed drive hub for a bicycle in which the at least one drive element drives the sprocket set to move so that the actuator moves to the multiple speed changing positions in a release direction relative to the speed-changing transmission, and the sprocket set smoothly changes to one of the multiple speed changing positions based on using requirements.

BRIEF DESCRIPTION OF THE DRAWINGS

FIG. 7 is a cross sectional view showing the operation of the multi-speed drive hub for the bicycle according to the preferred embodiment of the present invention.

FIG. 8 is another cross sectional view showing the operation of the multi-speed drive hub for the bicycle according to the preferred embodiment of the present invention.

DETAILED DESCRIPTION OF THE PREFERRED EMBODIMENTS

With reference to FIGS. 1-14, a multi-speed drive hub for a bicycle according to a preferred embodiment of the present invention comprises: a hub shaft 10 connected on a center of a wheel rim of the bicycle, and the hub shaft 10 includes a speed-changing transmission 101 arranged on an end thereof.

The speed-changing transmission 101 includes a first extension section 102, a second extension section 104 extending from the first extension section 102, and a stepped shoulder 109 formed on the first extension section 102 and the second extension 104. The first extension section 102 has multiple first notches 1021 defined thereon and has multiple second notches 1022 defined on the multiple first notches 1021 respectively, wherein each of the multiple second notches 1022 is formed in a sector shape.

At least one drive element 40 is arranged on an outer wall of the speed-changing transmission 101, and each of the at least one drive elements 40 includes multiple retainers 42, multiple columns 41 formed from bottoms of the multiple retainers 42 respectively and accommodated in the multiple first notches 1021, multiple force segments 43 arranged on free ends of the multiple retainers 42 and received in the multiple second notch 1022 individually, multiple rotation posts 44 respectively extending from bottoms of the multiple force segments 43 and exposing outside the speed-changing transmission 101, and multiple resilient elements 45 individually accommodated in the multiple columns 41, such that the multiple retainers 42 individually force the multiple resilient elements 45 to move back original positions when rotating.

The stepped shoulder 109 has a receiving portion 103 arranged thereon and configured to receive a driven element 20, and the driven element 20 includes multiple first indentions 21 accommodating the multiple rotation posts 44 respectively. The driven element 20 includes a connection segment 22 extending from an end thereof.

The speed-changing transmission 101 further includes an accommodation chamber 107 defined in a center of the second extension section 104, a slot 108 formed between an outer wall of the second extension section 104 and the accommodation chamber 107 so as to accommodate an actuator 30. The actuator 30 includes a first orifice 32 defined on a first end thereof and includes an operation segment 31 arranged on a second end of the actuator 30 and connected with a driving cable (not shown) of the bicycle. The first orifice 32 accommodates a first bolt 33, the second extension section 104 has a recess 106 defined on the outer wall thereof and corresponding to the slot 108 so that a first end of the first bolt 33 extends out of the recess 106, and a second end of the first bolt 33 is received in a second orifice 167 of a movable element 16. The movable element 16 has a coupling portion 161 connected into the second extension section 104 so that the actuator 30 actuates the movable element 16 to move on the second extension section 104 reciprocately. The movable element 16 has a third orifice 162 for receiving the connection segment 22 of the driven element 20, and a second bolt 166 is inserted into a fourth orifice 163 of the movable element 16 so as to fix the connection segment 22 of the driven element 20 further, and the actuator 30 actuates the movable element 16 and the driven element 20 to move simultaneously.

The movable element 16 further has two defining stems 165 inserted into a first end and a second end of the movable element 16 respectively, two springs 164 fitted on the two defining stems 165 individually, wherein one of the two springs 164 abuts against the stepped shoulder 109 of the speed-changing transmission 101, and the other spring 164 is biased against a stopper 17. The stopper 17 has an insertion portion 171 inserted into the second extension section 104 so that the actuator 30 drives the multiple force segments 43 of each drive element 40 to rotate reciprocately.

The stopper 17 is fixed on the second extension section 104 of the speed-changing transmission 101 by ways of multiple first fixing holes 105 of the second extension section 104, and the stopper 17 has multiple second fixing orifices 172 corresponding to the multiple first fixing holes 105 respectively so that multiple third bolts 173 are inserted through the multiple second fixing orifices 172 and the multiple first fixing holes 105 individually, thus fixing the stopper 17 on the second extension section 104.

A speed shifter 11 includes a fitting sleeve 13 fitted on the speed-changing transmission 101, and the fitting sleeve 13 has a third fixing orifice 14 corresponding to the at least one drive element 40 so that the at least one drive element 40 exposes outside the third fixing orifice 14. The fitting sleeve 13 has multiple ribs 12 extending around an outer wall thereof and has multiple flexible sheets 15 covering the multiple ribs 12 individually, wherein each of the multiple ribs 12 has two cutouts 121 defined on two ends of each rib 12 respectively so as to engage with two hooks of each of the multiple flexible sheets 15 individually, and each flexible sheet 15 has a plurality of dented portions 152 and multiple raised portions 151 which are all arranged on an outer wall of each flexible sheet 15, and each of the plurality of dented portions 152 is defined between any two adjacent raised portions 151.

A sprocket set 50 is meshed with a chain of the bicycle, and the sprocket set 50 includes multiple speed cassettes 54 of different diameters, multiple limitation elements 56 mounted the multiple speed cassettes 54 on a predetermined position of the bicycle (not shown), and multiple spacing spaces 55, each of which is defined any two adjacent speed cassettes 54. The sprocket set 50 further includes a joining portion 51 formed on a center thereof, a force element 52 secured in the joining portion 51 and connected with the fitting sleeve 13, multiple second indentions 53 formed in the force element 52 and retained with the multiple ribs 12 of the speed-changing transmission 101, such that the sprocket set 50 is driven by the speed shifter 11, the multiple speed cassettes 54 are retained with the plurality of dented portions 152 of each flexible sheet 15 respectively, the multiple raised portions 151 of each flexible sheet 15 align with the multiple spacing spaces 55 individually, and the multiple spacing spaces 55 align with the multiple force segments 43 of each drive element 40 respectively, such that the sprocket set 50 is driven by the multiple force segments 43 of the multiple retainers 42 of each drive element 40 to move horizontally, thus changing a speed of the bicycle.

When the driving cable of the bicycle is controlled to urge the operation segment 31 to change the speed of the bicycle, the actuator 30 actuates the movable element 16 to move away from the stopper 17 and drives the driven element 20 to move simultaneously. In the meantime, the multiple first indentions 21 of the driven element 20 respectively rotate the multiple rotation posts 44 of each drive element 40 to a predetermined angle, and the multiple spacing spaces 55 align with the multiple raised portions 151 of each flexible sheet 15 and the multiple force segments 43 of each drive element 40 individually.

When the multiple rotation posts 44 of each drive element 40 are rotated to the predetermined angle, they drive the sprocket set 50 to move horizontally, as shown in FIGS. 8-14, the multiple speed cassettes 54 are retained with the plurality of dented portions 152 of each flexible sheet 15 respectively and are rotated to engage with the multiple raised portions 151 of each flexible sheet 15 individually so that the multiple speed cassettes 54 press each flexible sheet 15 to move at a distance, and each flexible sheet 15 moves back to an original position, hence the multiple speed cassettes 54 moves to multiple speed changing positions so as to change the speed of the bicycle. Preferably, each flexible sheet 15 is made of flexible steel.

Accordingly, the at least one drive element 40 drives the sprocket set 50 to move so that the actuator 30 moves to the multiple speed changing positions in a release direction relative to the speed-changing transmission 101, and the sprocket set 50 smoothly changes to one of the multiple speed changing positions based on using requirements.

Figure 1:
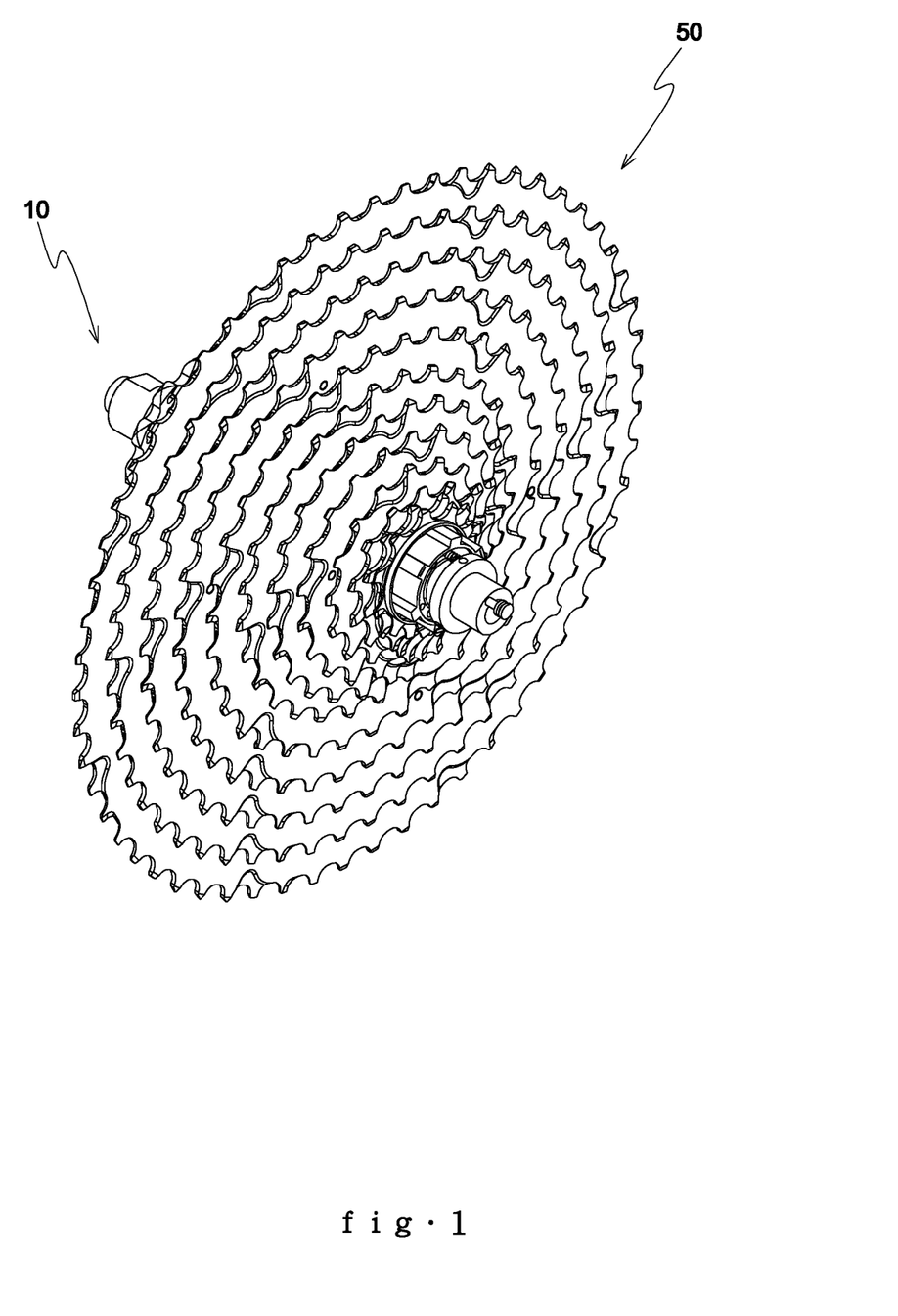
FIG. 1 is a perspective view showing the assembly of a multi-speed drive hub for a bicycle according to a preferred embodiment of the present invention.
Figure 2:
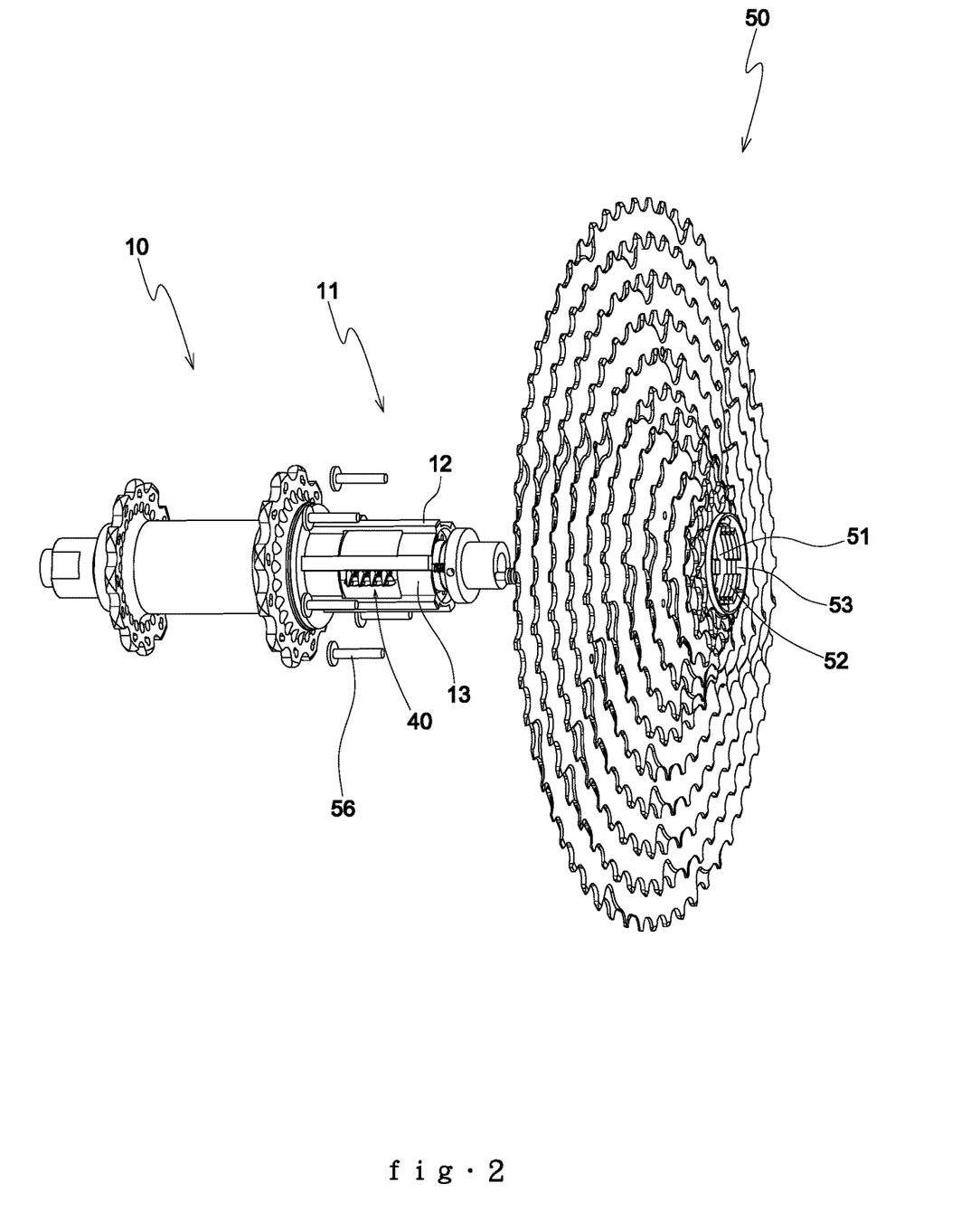
FIG. 2 is a perspective view showing the exploded components of the multi-speed drive hub for the bicycle according to the preferred embodiment of the present invention.
Figure 3:
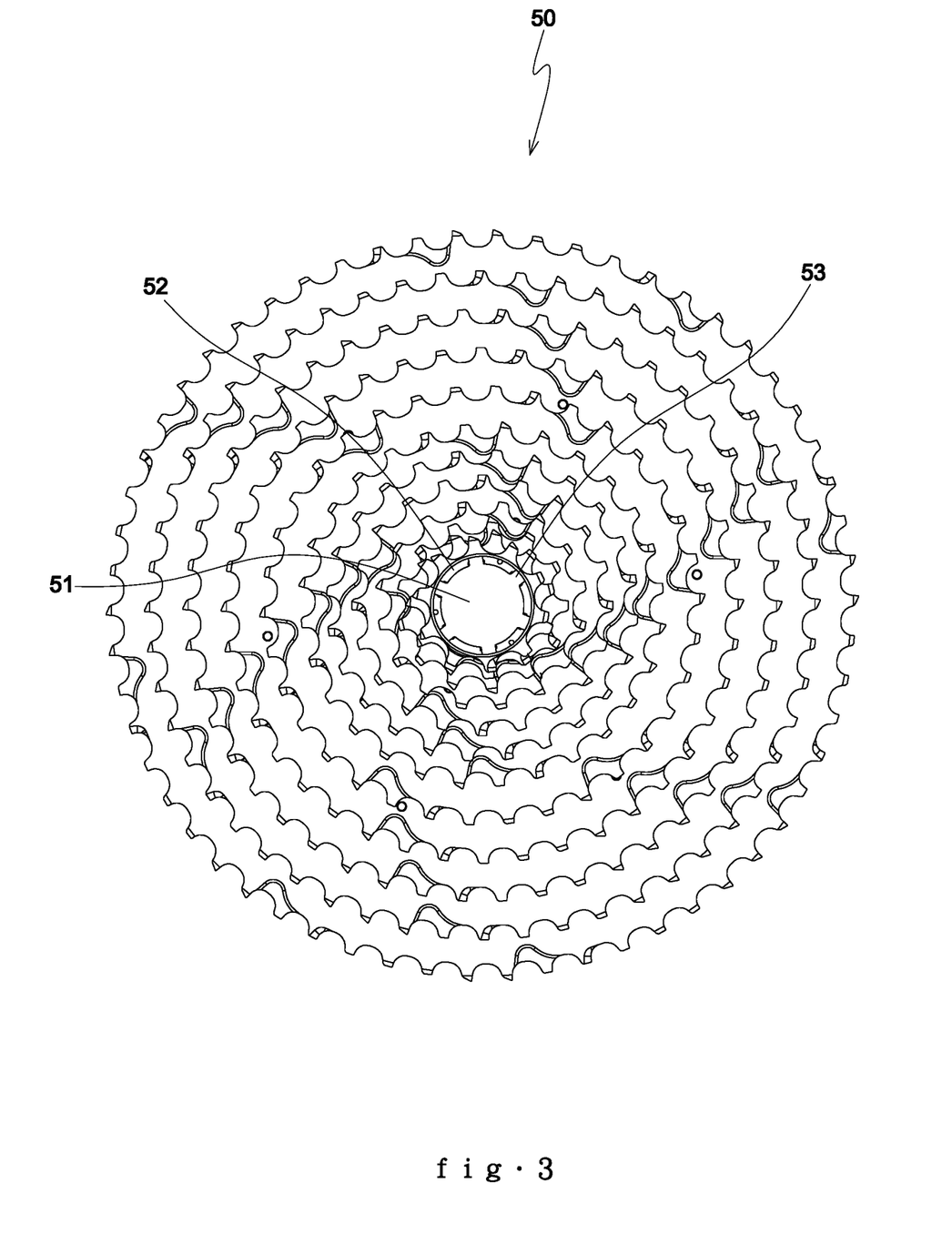
FIG. 3 is a side plan view showing the assembly of a part of the multi-speed drive hub for the bicycle according to the preferred embodiment of the present invention.
Figure 4:
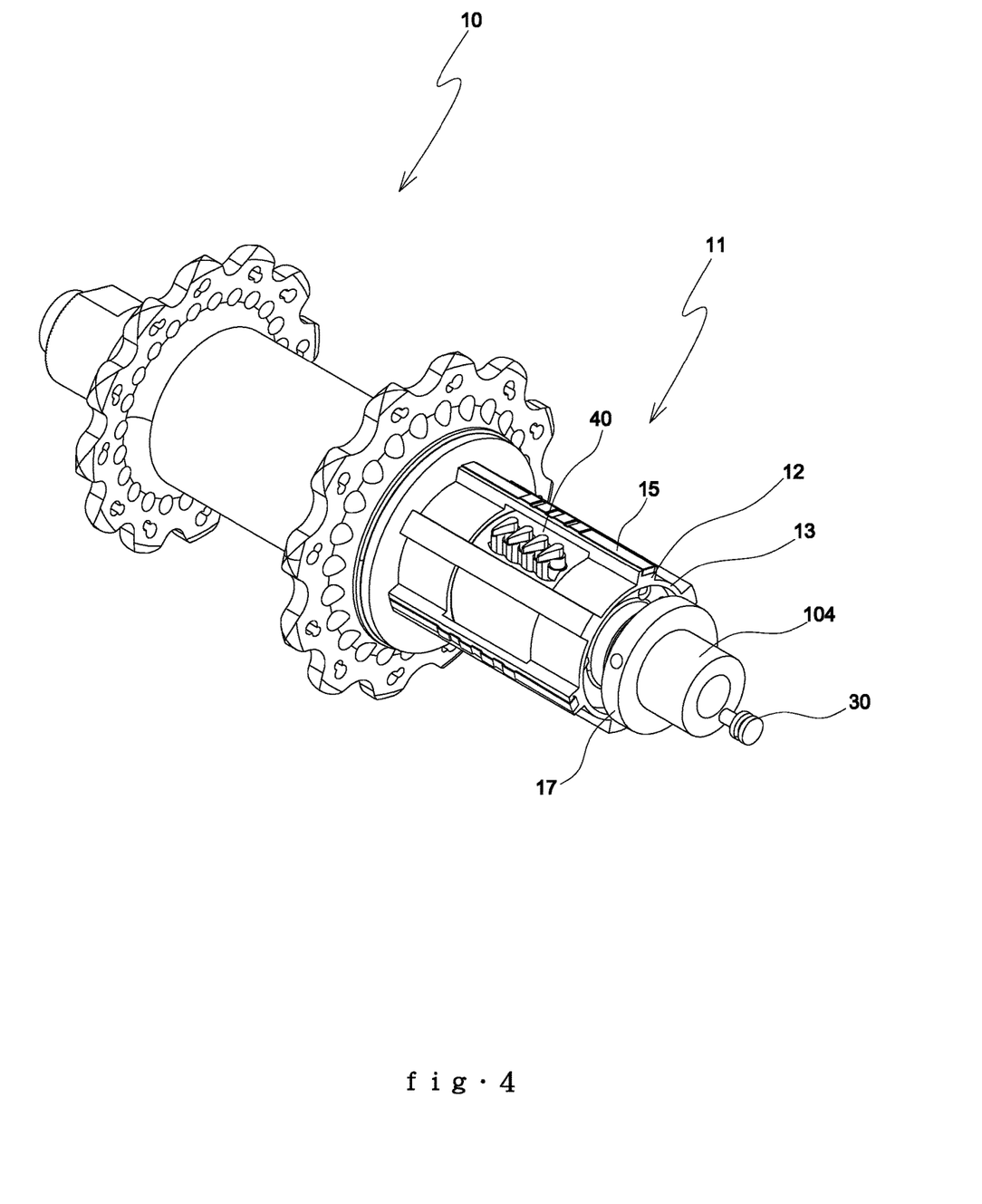
FIG. 4 is a perspective view showing the assembly of a part of the multi-speed drive hub for the bicycle according to the preferred embodiment of the present invention.
Figure 5:
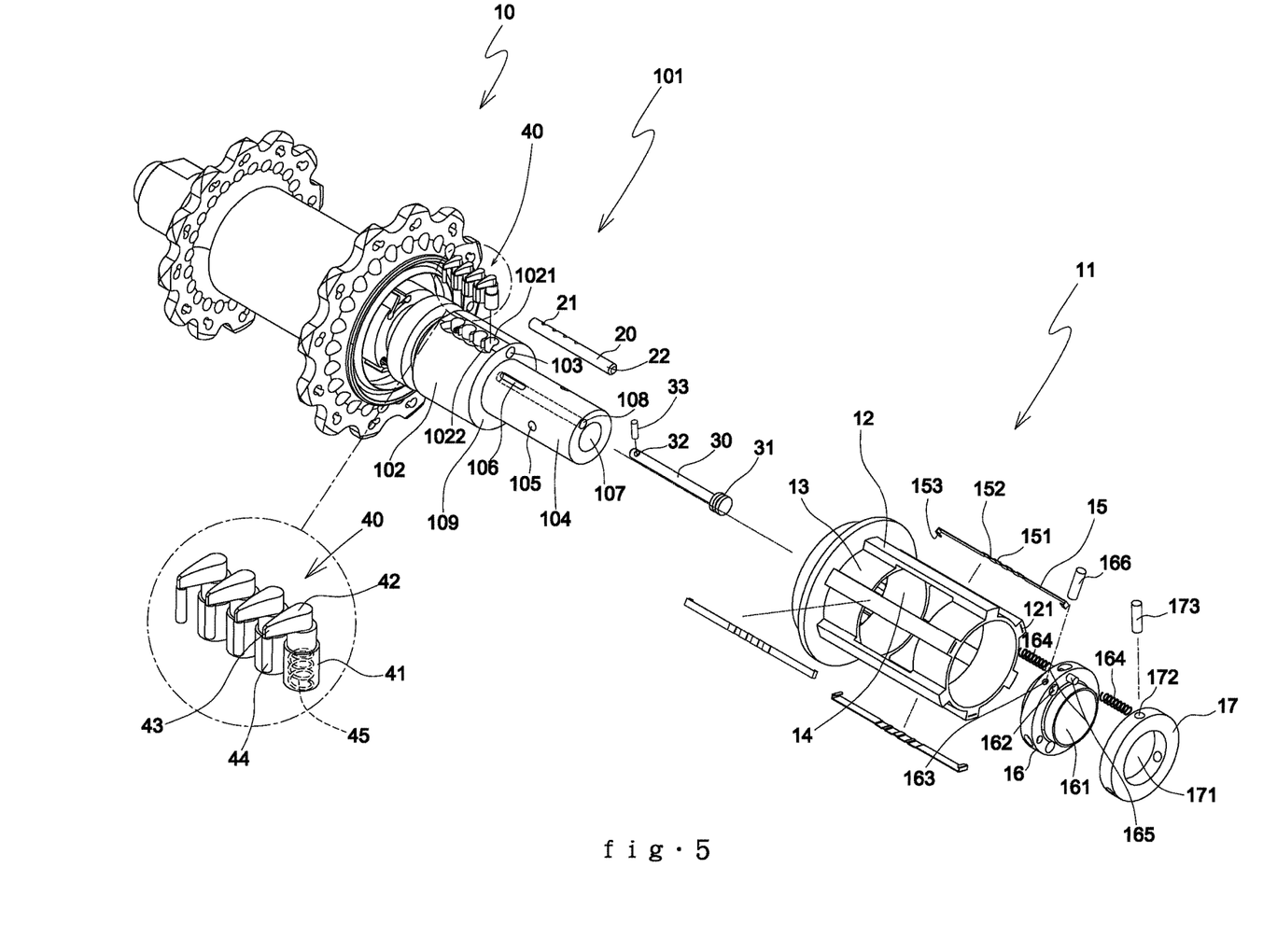
FIG. 5 is another perspective view showing the exploded components of the multi-speed drive hub for the bicycle according to the preferred embodiment of the present invention.
Figure 6:
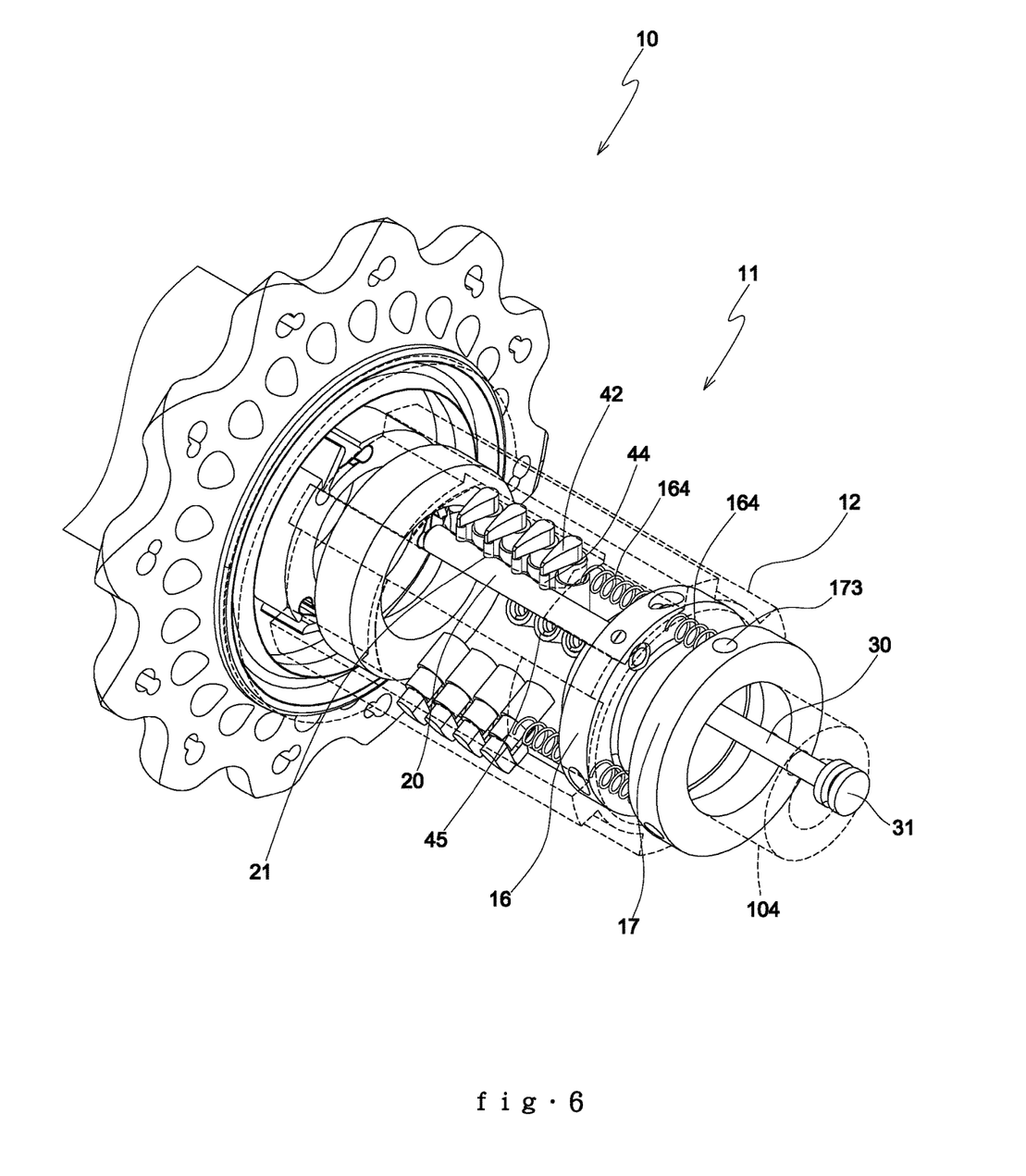
FIG. 6 is a perspective view showing the assembly of the multi-speed drive hub for the bicycle according to the preferred embodiment of the present invention.
Figure 9:
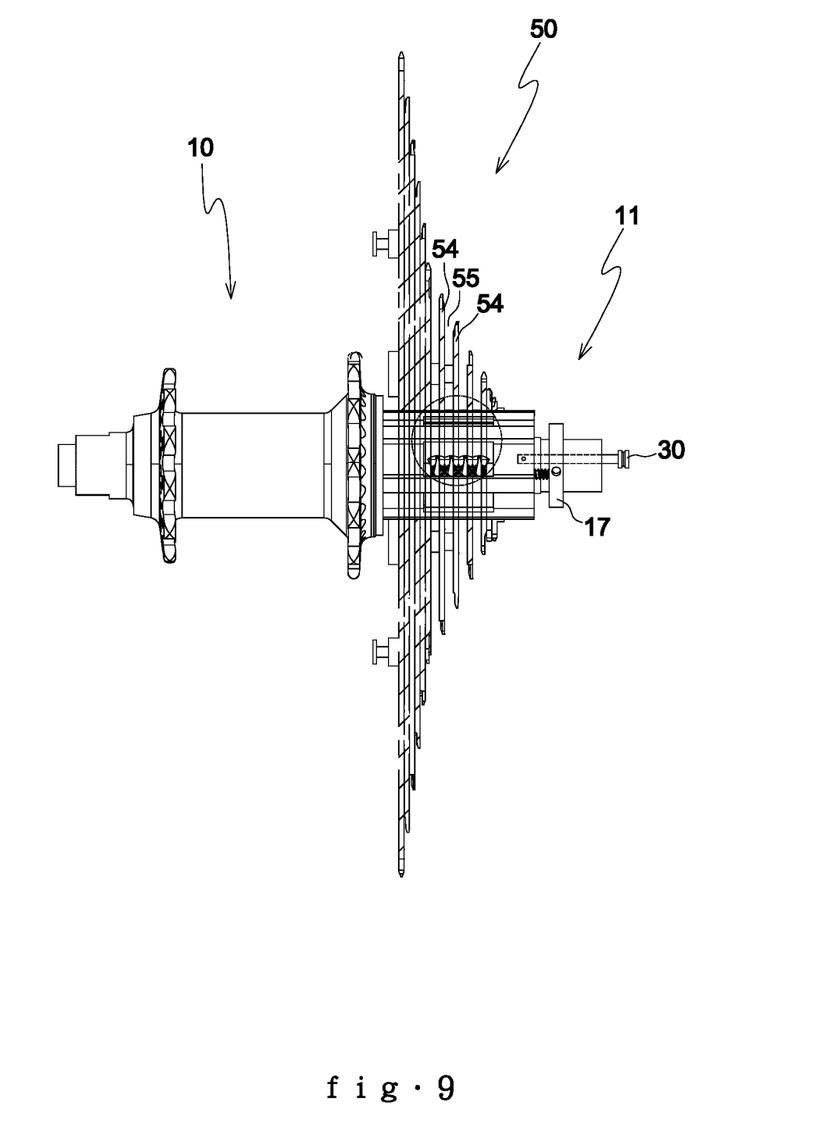
FIG. 9 is also a side plan view showing the operation of the multi-speed drive hub for the bicycle according to the preferred embodiment of the present invention.
Figure 10:
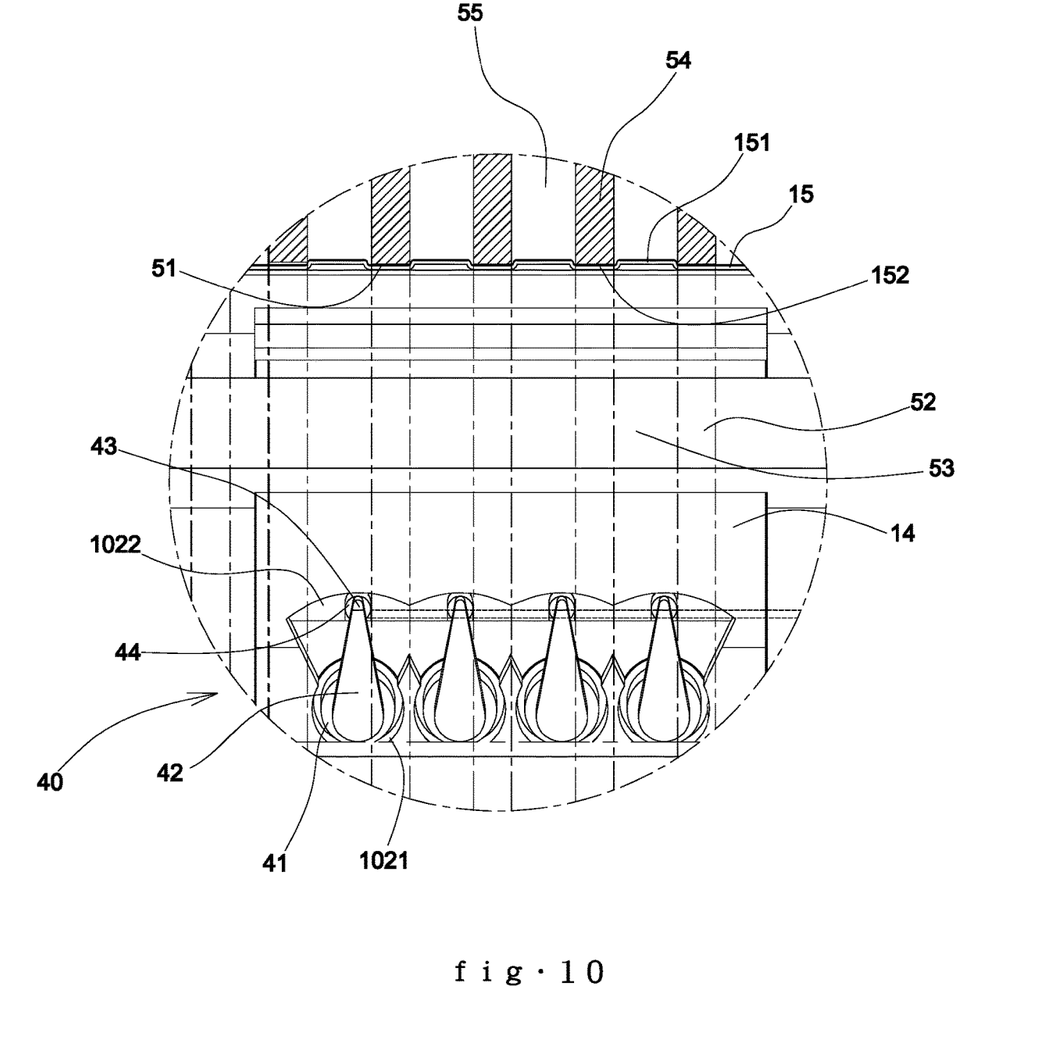
FIG. 10 is an amplified side plan view of a part of FIG. 9.
Figure 11:
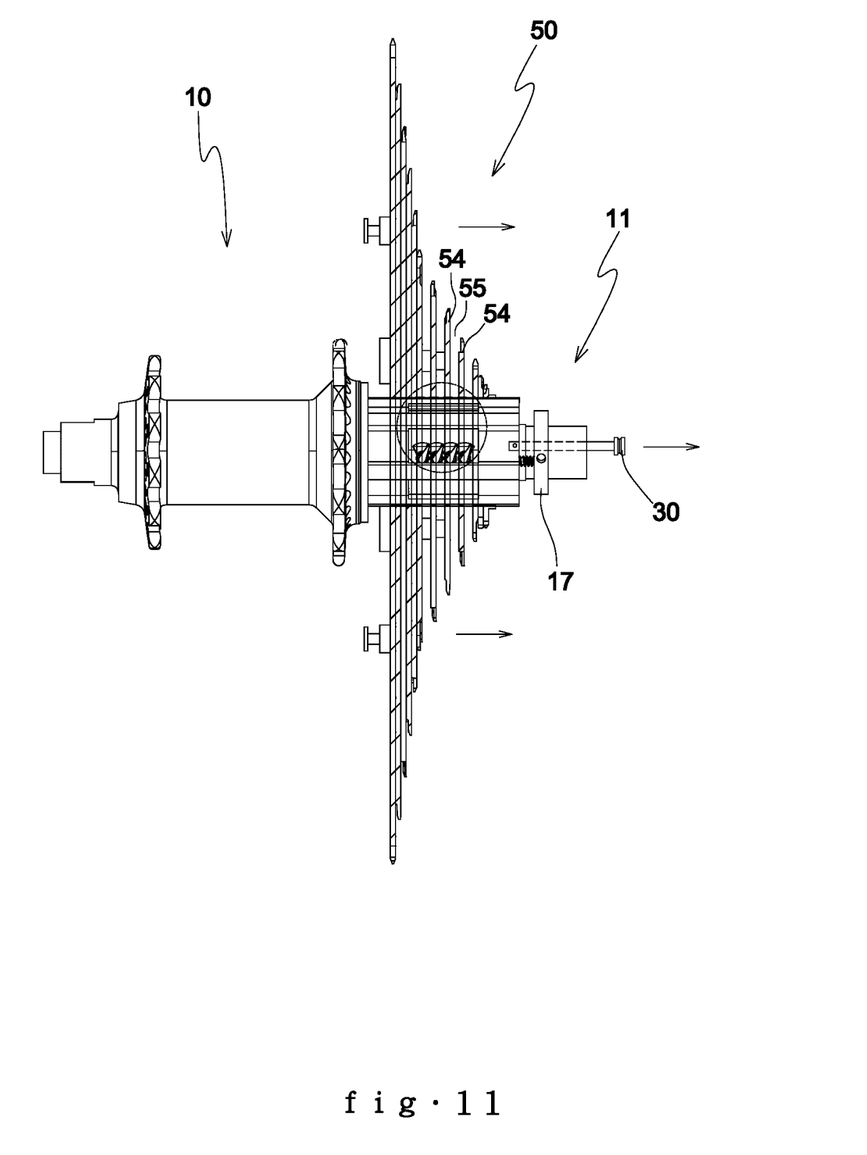
FIG. 11 is another side plan view showing the operation of the multi-speed drive hub for the bicycle according to the preferred embodiment of the present invention.
Figure 12:
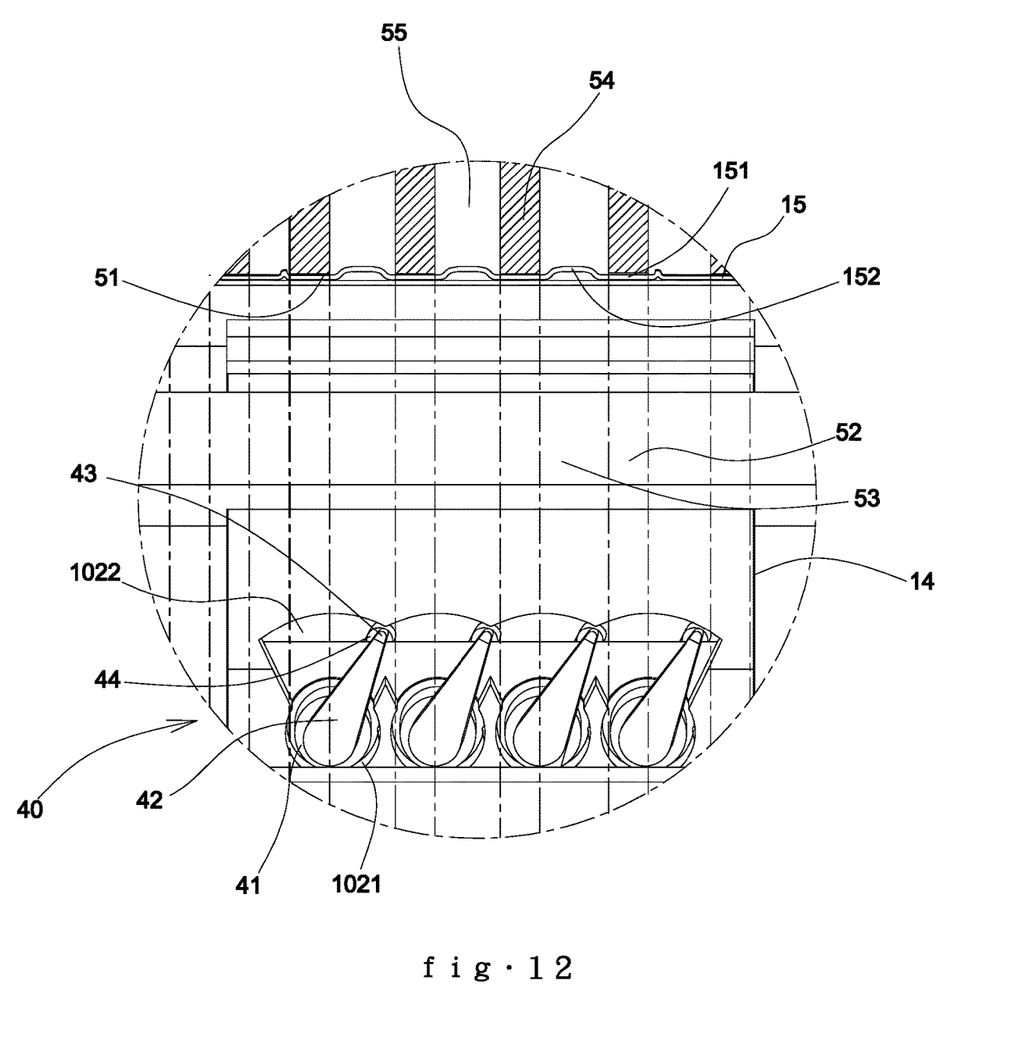
FIG. 12 is an amplified side plan view of a part of FIG. 11.
Figure 13:
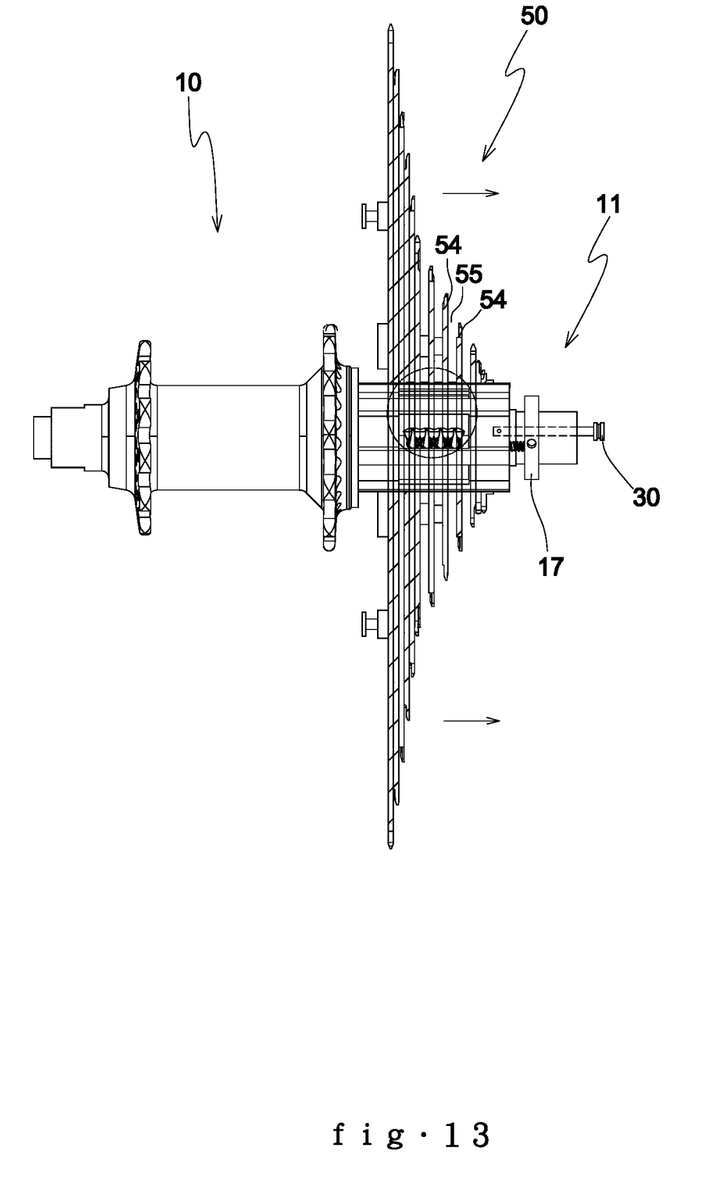
FIG. 13 is also another side plan view showing the operation of the multi-speed drive hub for the bicycle according to the preferred embodiment of the present invention.
Figure 14:
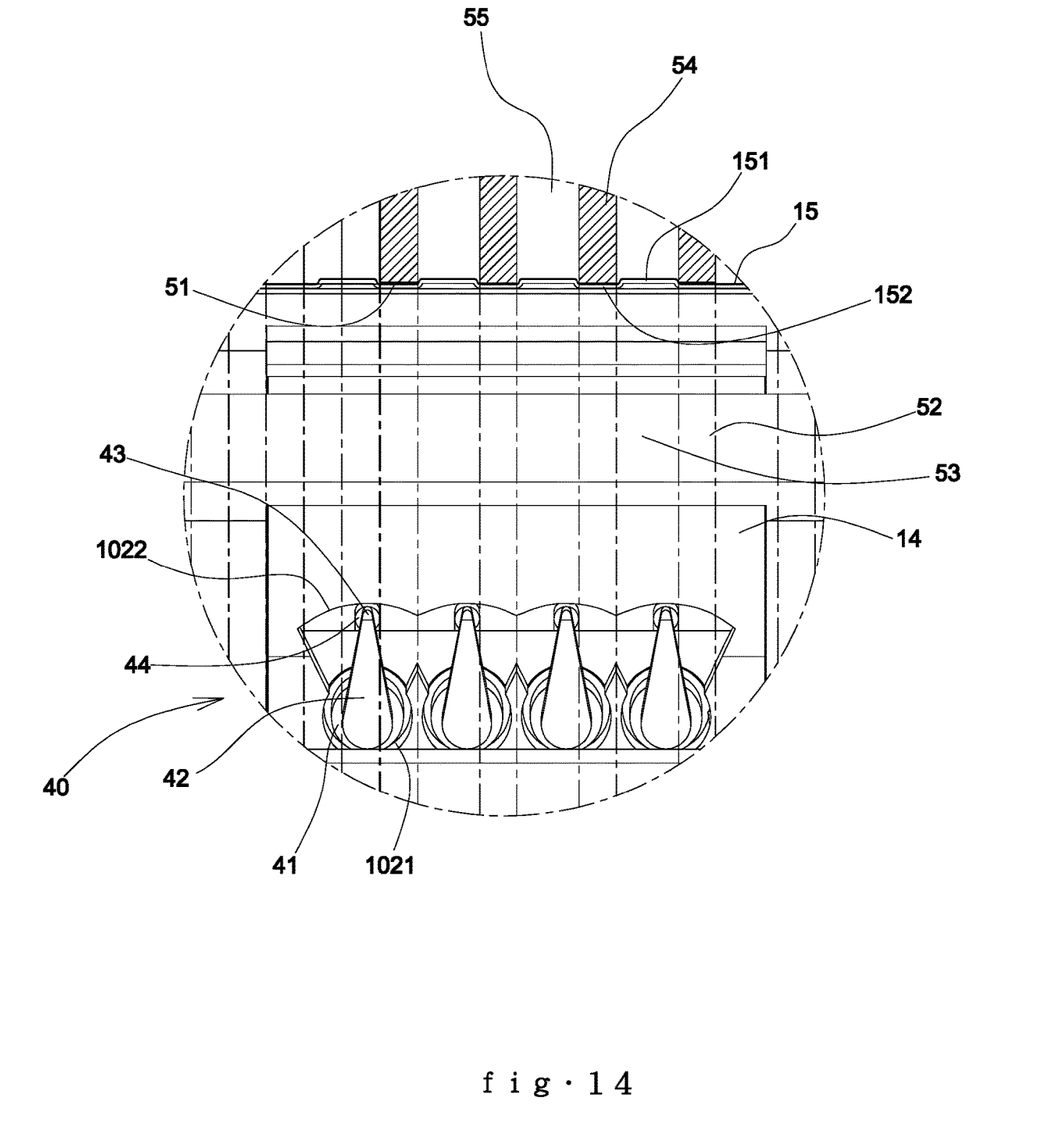
FIG. 14 is an amplified side plan view of a part of FIG. 13.

As illustrated in FIG. 6, in another embodiment, multiple driven elements 20 are received around the first extension section 102 of the speed-changing transmission 101.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A multi-speed drive hub for a bicycle comprising:
a hub shaft connected on a center of a wheel rim of the bicycle, and the hub shaft including a speed-changing transmission arranged on an end of the hub shaft;
the speed-changing transmission including at least one drive element arranged on an outer wall of the speed-changing transmission, and the speed-changing transmission including an actuator arranged on an end of the speed-changing transmission and drives multiple force segments of the at least one drive element speed to rotate reciprocately;
a speed shifter including a fitting sleeve fitted on the speed-changing transmission, and the fitting sleeve having a third fixing orifice corresponding to the at least one drive element so that the at least one drive element is exposed through the third fixing orifice;
a sprocket set including multiple speed cassettes of different diameters, the sprocket set including multiple spacing spaces, each of which is defined between any two adjacent speed cassettes;
wherein the fitting sleeve has multiple ribs extending around an outer wall thereof and has multiple flexible sheets covering the multiple ribs individually;
wherein each of the at least one drive elements includes multiple retainers, multiple columns formed from bottoms of the multiple retainers respectively, and the multiple force segments arranged on free ends of the multiple retainers, said multiple force segments being exposed through the third fixing orifice;
wherein each flexible sheet has a plurality of dented portions and multiple raised portions which are all arranged on an outer wall of each flexible sheet, and each of the plurality of dented portions is defined between any two adjacent raised portions;
wherein the sprocket set includes a joining portion formed on a center thereof, a force element secured in the joining portion and connected with the fitting sleeve, and multiple second indentions formed in the force element and retained with the multiple ribs of the fitting sleeve respectively.

2. The multi-speed drive hub as claimed in claim 1, wherein the speed-changing transmission includes a first extension section, a second extension section extending from the first extension section, and a stepped shoulder formed on the first extension section and the second extension; the first extension section has multiple first notches defined thereon and has multiple second notches defined on the multiple first notches respectively, wherein each of the multiple second notches is formed in a sector shape; the multiple columns of the multiple retainers are accommodated in the multiple first notches, the multiple force segments of the multiple retainers are received in the multiple second notches individually, and multiple rotation posts respectively extend from bottoms of the multiple force segments, the stepped shoulder has a receiving portion arranged thereon and configured to receive a driven element, wherein the driven element includes multiple first indentions accommodating the multiple rotation posts respectively, and the driven element includes a connection segment extending from an end thereof.

3. The multi-speed drive hub as claimed in claim 2, wherein the speed-changing transmission further includes an accommodation chamber defined in a center of the second extension section, a slot formed between an outer wall of the second extension section and the accommodation chamber so as to accommodate the actuator, the actuator includes a first orifice defined on a first end thereof and includes an operation segment arranged on a second end of the actuator; the first orifice accommodates a first bolt, the second extension section has a recess defined on the outer wall thereof and corresponding to the slot so that a first end of the first bolt extends out of the recess, and a second end of the first bolt is received in a second orifice of a movable element, wherein the movable element has a coupling portion through which the second extension section is inserted into so that the actuator actuates the movable element to move on the second extension section reciprocately, wherein the movable element has a third orifice for receiving the connection segment of the driven element, and a second bolt is inserted into a fourth orifice of the movable element so as to fix the connection segment of the driven element further, and the actuator actuates the movable element and the driven element to move simultaneously.

4. The multi-speed drive hub as claimed in claim 3, wherein the movable element further has two defining stems inserted into a first end and a second end of the movable element respectively, two springs fitted on the two defining stems individually, wherein one of the two springs abuts against the stepped shoulder of the speed-changing transmission, and the other spring is biased against a stopper, wherein the stopper has an insertion portion through which the second extension section is inserted into.

5. The multi-speed drive hub as claimed in claim 4, wherein the stopper is fixed on the second extension section of the speed-changing transmission by ways of multiple first fixing holes of the second extension section, and the stopper has multiple second fixing orifices corresponding to the multiple first fixing holes respectively so that multiple third bolts are inserted through the multiple second fixing orifices and the multiple first fixing holes individually, thus fixing the stopper on the second extension section.

6. The multi-speed drive hub as claimed in claim 1, wherein multiple resilient elements are individually accommodated in the multiple columns.

7. The multi-speed drive hub as claimed in claim 1, wherein multiple driven elements are received around the first extension section of the speed-changing transmission.

* * * * *